(12) United States Patent
Kawamoto

(10) Patent No.: US 10,936,763 B2
(45) Date of Patent: Mar. 2, 2021

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventor: Shintaro Kawamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 86 days.

(21) Appl. No.: 16/140,559

(22) Filed: Sep. 25, 2018

(65) Prior Publication Data
US 2019/0325091 A1    Oct. 24, 2019

(30) Foreign Application Priority Data

Apr. 23, 2018 (JP) .............................. JP2018-082160

(51) Int. Cl.
| G06F 30/13 | (2020.01) |
| G06F 16/50 | (2019.01) |
| G06F 16/11 | (2019.01) |
| G06F 16/18 | (2019.01) |

(52) U.S. Cl.
CPC ............ *G06F 30/13* (2020.01); *G06F 16/122* (2019.01); *G06F 16/1873* (2019.01); *G06F 16/50* (2019.01)

(58) Field of Classification Search
CPC .... G06F 30/13; G06F 16/1873; G06F 16/122; G06F 16/50; G06F 16/583
See application file for complete search history.

(56) References Cited

U.S. PATENT DOCUMENTS

| 2006/0155407 A1* | 7/2006 | Azuma | G06F 30/00 700/105 |
| 2010/0268513 A1* | 10/2010 | Loberg | G06F 30/13 703/1 |
| 2016/0021803 A1* | 1/2016 | Iwata | H05K 13/085 703/6 |
| 2016/0127285 A1* | 5/2016 | Toyoda | G06Q 50/10 709/206 |

FOREIGN PATENT DOCUMENTS

| JP | 2010140422 | 6/2010 |
| JP | 2016025131 | 2/2016 |

* cited by examiner

*Primary Examiner* — Neil R McLean
(74) *Attorney, Agent, or Firm* — Volpe Koenig

(57) ABSTRACT

An information processing apparatus includes a first drawing information acquiring unit that acquires first drawing information used for design, a second drawing information identifying unit that identifies second drawing information associated with the first drawing information, a basic policy information acquiring unit that acquires basic policy information associated with the second drawing information, the basic policy information representing a basic policy for at least one of design and production, and an output unit that, in response to acquisition of information instructing that a design change be made to the first drawing information, outputs a basic policy corresponding to the design change from the basic policy information.

13 Claims, 4 Drawing Sheets

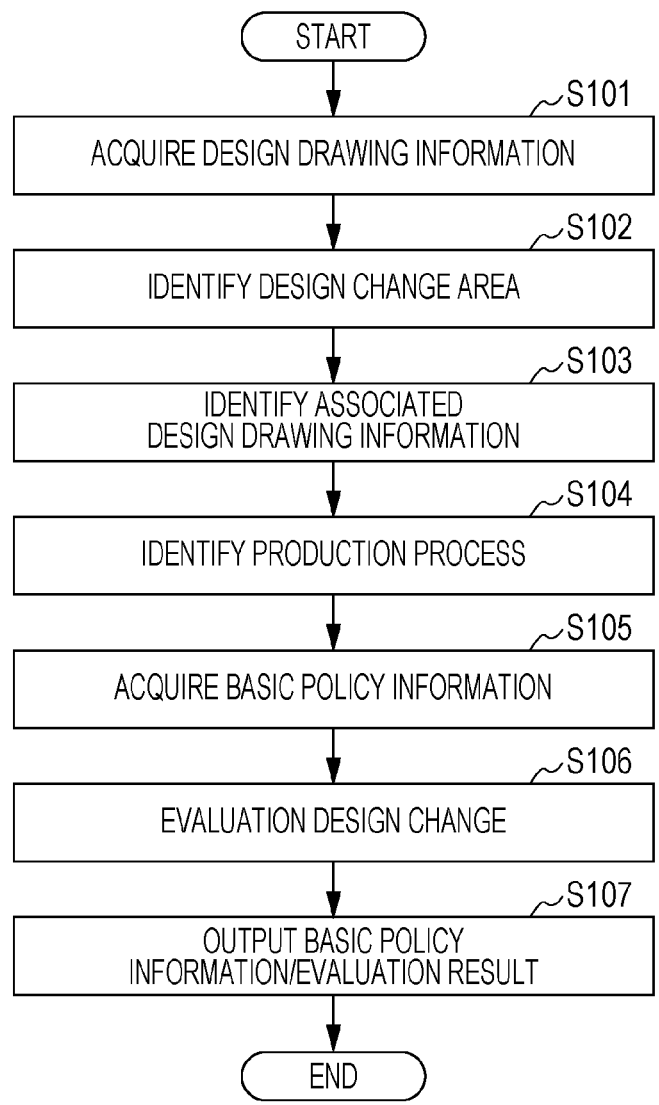

FIG. 4

| # | DRAWING | FACTORY | PRODUCTION LINE | PROCESS | CATEGORY | ITEM | VALUE |
|---|---|---|---|---|---|---|---|
| 1 | DRAWING A | SHIZUOKA | BOARD MOUNTING | COMPONENT PLACEMENT | XX EQUIPMENT | MANUFACTURER | XX COMPANY |
| 2 | DRAWING A | SHIZUOKA | BOARD MOUNTING | COMPONENT PLACEMENT | XX EQUIPMENT | MODEL | X100001 |
| 3 | DRAWING A | SHIZUOKA | BOARD MOUNTING | COMPONENT PLACEMENT | PREREQUISITE | SPECIFICATION | PRODUCTION NOT POSSIBLE UNLESS COMPONENT PITCH IS 1 mm OR MORE |
| 4 | DRAWING A | SHIZUOKA | BOARD MOUNTING | COMPONENT PLACEMENT | KNOW-HOW | PRODUCTIVITY | INSERTION TAKES TIME UNLESS COMPONENT PITCH IS 2 mm TO 3 mm |
| 5 | DRAWING A | SHIZUOKA | BOARD MOUNTING | COMPONENT PLACEMENT | ... | ... | ... |
| 6 | DRAWING A | SHIZUOKA | BOARD MOUNTING | SOLDERING | AA EQUIPMENT | MANUFACTURER | AA COMPANY |
| 7 | DRAWING A | SHIZUOKA | BOARD MOUNTING | SOLDERING | AA EQUIPMENT | MODEL | A999999 |
| 8 | DRAWING A | SHIZUOKA | BOARD MOUNTING | SOLDERING | SOLDER | TYPE | TIN 60%, LEAD 40% |
| 9 | DRAWING A | SHIZUOKA | BOARD MOUNTING | SOLDERING | KNOW-HOW | QUALITY | ORIENT COMPONENT ORTHOGONALLY TO DIRECTION OF BOARD FLOW |
| 10 | DRAWING A | SHIZUOKA | BOARD MOUNTING | SOLDERING | KNOW-HOW | QUALITY | SEPARATE BOARD'S EDGE AND COMPONENT BY 2 cm OR MORE |
| 11 | DRAWING A | SHIZUOKA | BOARD MOUNTING | SOLDERING | KNOW-HOW | ... | ... |
| 12 | DRAWING A | SHIZUOKA | BOARD MOUNTING | IMAGE INSPECTION | YY EQUIPMENT | MANUFACTURER | YY COMPANY |
| 13 | DRAWING A | SHIZUOKA | BOARD MOUNTING | IMAGE INSPECTION | YY EQUIPMENT | MODEL | Y123456 |
| 14 | DRAWING C | SHIZUOKA | ... | ... | ... | ... | ... |
| 15 | DRAWING X | CHIBA | ... | ... | ... | ... | ... |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-082160 filed Apr. 23, 2018.

BACKGROUND

(i) Technical Field

The present disclosure relates to an information processing apparatus, and a non-transitory computer readable medium.

(ii) Related Art

Japanese Unexamined Patent Application Publication No. 2016-025131 describes a component mounting system that mounts a component onto a board by use of multiple pieces of production data linked to component data. The component mounting system includes a component mounting line having a component mounting apparatus that executes mounting of the component onto the board, a simulation executing unit that, in response to a change to the component data, executes takt time simulation based on the production data, and an improvement-plan output unit that, based on the results of simulation obtained after the change to the component data, derives and outputs an improvement plan aimed at takt time improvement.

Japanese Unexamined Patent Application Publication No. 2010-140422 describes a product design apparatus. With the production design apparatus, specification information about the specifications of a product requested from an orderer is input from a business terminal apparatus, and the input specification information is presented to a technical terminal apparatus and a factory terminal apparatus. When constraint information about constraints applied for the design and manufacture of a product is input from the technical terminal apparatus and the factory terminal apparatus, a calculation server creates, based on the input specification information, a delivery specification plan, which serves as the basis for the product, and detailed design specification plans that take the constraints into account. A web server presents, to the business terminal, the delivery specification plan and only those detailed design specification plans whose disclosure has been approved, and presents the detailed design specification plans to only the technical terminal apparatus and the factory terminal apparatus.

Making a design change to a hitherto produced product may sometimes cause adverse effects on the production of the product, such as diminished productivity or deteriorated product quality compared to the pre-change product. This is due to the fact that, at the design phase when such a design change is made, factors such as prerequisites, constraints, or know-how for the production of the product are not likely to be taken into account. For cases where a new product has been designed, production of the product may be sometimes adversely affected for reasons such as the product being actually found to be difficult to produce upon transition to the production phase. This is due to the fact that, at the design phase of the product, factors such as prerequisites, constraints, or know-how for the design/production of the product are not likely to be taken into account. In other words, it is required to take into account, at the design phase of the product, a basic policy such as prerequisites, constraints, or know-how used in associated past design/production.

SUMMARY

Aspects of non-limiting embodiments of the present disclosure relate to reduce adverse effects on the production of a product in comparison to cases where information about a basic policy used in associated past design/production is not acquired.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a first drawing information acquiring unit that acquires first drawing information used for design, a second drawing information identifying unit that identifies second drawing information associated with the first drawing information, a basic policy information acquiring unit that acquires basic policy information associated with the second drawing information, the basic policy information representing a basic policy for at least one of design and production, and an output unit that, in response to acquisition of information instructing that a design change be made to the first drawing information, outputs a basic policy corresponding to the design change from the basic policy information.

BRIEF DESCRIPTION OF THE DRAWINGS

Exemplary embodiment of the present disclosure will be described in detail based on the following figures, wherein:

FIG. 3 is a flowchart illustrating exemplary operation of an information processing apparatus; and FIG. 4 illustrates exemplary basic policy information according to Example 1.

DETAILED DESCRIPTION

An exemplary embodiment of the present disclosure will be described below in detail with reference to the attached drawings.

Figure 1:
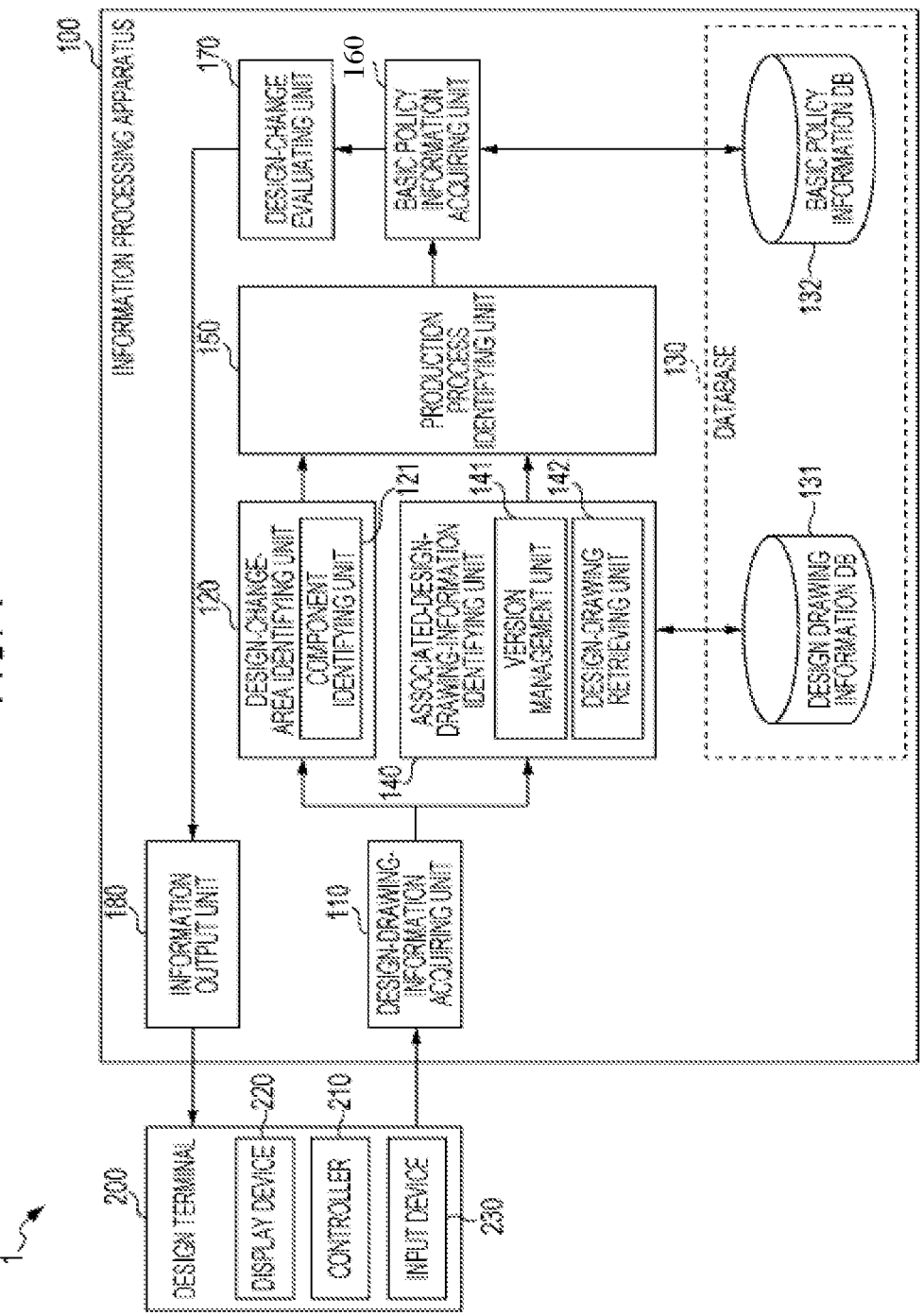
FIG. 1 illustrates an information processing system according to an exemplary embodiment of the present disclosure.

FIG. 1 illustrates an information processing system 1 according to the exemplary embodiment. FIG. 1 depicts the respective functional blocks of an information processing apparatus 100 and a design terminal 200, which constitute the information processing system 1.

The information processing system 1 includes the information processing apparatus 100 and the design terminal 200. The information processing apparatus 100 is connected to the design terminal 200. The information processing apparatus 100 and the design terminal 200 may not necessarily be placed in a single location. That is, in addition to being connected via a local area network (LAN), the information processing apparatus 100 and the design terminal 200 may be connected via, for example, a network such as a wired network, a wireless network, or a composite wired-wireless network used for a metropolitan area network (MAN), a wide area network (WAN), the Internet, an intranet, or other networks.

As described below, the information processing apparatus 100 is an information processing apparatus that acquires, from the design terminal 200, information about a design drawing used for the purpose of design, identifies a design change area from the acquired information about the design drawing, identifies information about a design drawing associated with the design drawing, and outputs, from information about a basic policy (basic policy information) associated with the information about the associated design drawing, a basic policy related (corresponding) to a design change. In the present case, a basic policy refers to information such as prerequisites/constraints/know-how related to design/production. Hereinafter, information about a design drawing will be referred to as design drawing information, and information about a basic policy will be referred to as basic policy information.

Design drawings include a design-purpose design drawing used at the design phase of a product, and a production-purpose design drawing used at the production (mass production) phase of the product. The production-purpose design drawing used at the production phase is created based on the design-purpose design drawing for the purpose of actual product production. For example, if the product to be produced is a circuit board including multiple wiring layers, in the design-purpose design drawing, the multiple layers are depicted in an overlapped manner for easy recognition of circuit connections, whereas in the production-purpose design drawing, the multiple layers are depicted to be separated into individual layers to facilitate creation of each individual layer. Design-purpose design drawing information and production-purpose design drawing information are stored in association with each other. That is, it is possible to identify, from design-purpose design drawing information, the corresponding production-purpose design drawing information, and to identify, from production-purpose design drawing information, the corresponding design-purpose design drawing information. For example, production-purpose design drawing information may include information such as a management number of design-purpose design drawing information, or design-purpose design drawing information may include information such as a management number of production-purpose design drawing information. Production-purpose design drawing information and design-purpose design drawing information may be connected by a link. In the following description, a design-purpose design drawing (information) and a production-purpose design drawing (information) will be each referred to as a design drawing (information) without being distinguished from each other.

Design Terminal 200

First, the design terminal 200 will be described.

The design terminal 200 is a terminal apparatus operated by a designer and used for designing a product to be produced. The design terminal 200 is implemented as a computer that is identical or similar in hardware configuration to the information processing apparatus 100 illustrated in FIG. 2 described later. The design terminal 200 includes a controller 210, a display device 220, and an input device 230. The display device 220 is a display using a liquid crystal or organic EL. The display device 220 displays information such as the design drawing of a product designed by the designer. The input device 230 is an input unit such as a keyboard, a mouse, or a tablet. The input device 230 is operated by the designer to give a design-purpose instruction to the controller 210. The controller 210 is a processing unit that, based on an instruction from the designer, controls creation of a design drawing. The controller 210 also controls transmission and reception of information (data) to and from the information processing apparatus 100 described later. The transmission and reception of information are performed via a transmitting and receiving device (not illustrated) provided to the design terminal 200.

The design terminal 200 is implemented as a so-called computer-aided design (CAD) terminal. The designer operates the input device 230 while looking at a design drawing or other information displayed on the display device 220 to thereby design a product to be produced.

The following description is directed to the case of making a design change to a hitherto produced product to thereby design a product to be produced. Pre-change design drawing information, which refers to design drawing information prior to undergoing a design change, and post-change design drawing information, which refers to design drawing information that has undergone a design change, each represent an example of first drawing information.

Information Processing Apparatus 100

Next, the information processing apparatus 100 will be described.

The information processing apparatus 100 includes a design-drawing-information acquiring unit 110, a design-change-area identifying unit 120, a database 130, an associated-design-drawing-information identifying unit 140, a production process identifying unit 150, a basic policy information acquiring unit 160, a design-change evaluating unit 170, and an information output unit 180. The database 130 includes a design drawing information database (to be referred to as design drawing information DB hereinafter) 131, and a basic policy information database (to be referred to as basic policy information DB hereinafter) 132. The associated-design-drawing-information identifying unit 140 includes a version management unit 141, and a design-drawing retrieving unit 142. The design-change-area identifying unit 120 includes a component identifying unit 121.

The functions of various component units of the information processing apparatus 100 will be described below.

The design-drawing-information acquiring unit 110 is a communicating unit that acquires pre-change design drawing information and post-change design drawing information from the design terminal 200. The pre-change design drawing information and the post-change design drawing information acquired at this time represent design-purpose design drawing information. The pre-change design drawing information represents design drawing information used for the design of a hitherto produced product. The post-change design drawing information represents design drawing information used for the design of a product to be produced. The design-drawing-information acquiring unit 110 represents an example of a first drawing information acquiring unit.

The design-change-area identifying unit 120 is a processing unit that identifies a design change area from the difference between pre-change design drawing information and post-change design drawing information that have been acquired by the design-drawing-information acquiring unit 110. If information about a design change area has been explicitly acquired from the designer, it is not necessary for the design-change-area identifying unit 120 to identify a design change area. In the present case, a design change area is regarded to have been identified by the design-changearea identifying unit 120 even if information about the design change area has been acquired from the designer. The design-change-area identifying unit 120 represents an example of a design-change-area identifying unit.

A design change area is represented by a module name if a design change has been made to a module (if a change has been made to a module or to a part of a module), and by a component name if a design change has been made to a component. As a design change area, the area to which a design change has been made may be represented in the form of a geometric figure. Multiple such design change areas may be represented.

The component identifying unit 121 identifies a changed component if a design change area corresponds to a component.

The design drawing information DB 131 of the database 130 is a database to store information about past design drawings (to be referred to as past design drawing information hereinafter). As past design drawing information, the design drawing information DB 131 stores design-purpose design drawing information created in the past, and production-purpose design drawing information created in the past. As described above, design-purpose design drawing information, and production-purpose design drawing information created based on the design-purpose design drawing information are stored in association with each other. The design drawing information DB 131 represents an example of a drawing database.

If design drawings are managed by version (version symbol), past design drawing information is stored in a way that allows the past design drawing information to be searched by version. Further, past design drawing information is stored in such a way that allows the past design drawing information to be searched by using, as a key, information such as the product name of a product that has been produced based on the past design drawing information, the module name of a module representing a functional block that constitutes the product, the component name of a component used in the product, or the usage purpose/function of a product/module/component. Past design drawing information is also stored in such a way that a geometric figure is used as a key to retrieve past design drawing information including a similar geometric figure.

The basic policy information DB 132 of the database 130 is a database to store basic policy information associated with past design drawing information and representing a basic policy on design and/or production. A basic policy on design represents guidelines for design that need to be taken into account in creating a design-purpose design drawing or a production-purpose design drawing.

By contrast, production of a product involves, for example, equipment used for the production, conditions (prerequisites) that serve as prerequisites in using the equipment, conditions (constraints) that serve as constraints in producing the product by use of the equipment, and further, know-how related to the production. A basic policy on production represents guidelines for production that need to be taken into account in producing a product, such as the equipment, prerequisites, constraints, and know-how mentioned above.

The associated-design-drawing-information identifying unit 140 is a processing unit that identifies and acquires a past design drawing associated with a design drawing that has undergone a design change. A past design drawing associated with a design drawing that has undergone a design change will be herein referred to as associated design drawing. Associated design drawing information represents an example of second drawing information.

If design drawings are managed by version, the version management unit 141 of the associated-design-drawing-information identifying unit 140 identifies associated design drawing information from past design drawing information stored in the design drawing information DB 131. At this time, information about a past version of design drawing corresponding to the design drawing information to which a design change is being made is identified as associated design drawing information. It may be desired that the past version of design drawing be a version of design drawing based on which a product has been actually produced in the past. If the past version of design drawing is a design drawing based on which a product has been actually produced in the past, it is possible to readily obtain a basic policy about design and/or production. Whether drawings are managed by version is easily identified by whether the design drawing information to which a design change is being made contains version-related information.

If design drawings are not managed by version, the design-drawing retrieving unit 142 of the associated-design-drawing-information identifying unit 140 retrieves, from past design drawing information stored in the design drawing information DB 131, past design drawing information associated with the design drawing that has undergone a design change. That is, the design-drawing retrieving unit 142 retrieves the design drawing of a product with a similar design, and identifies the retrieved design drawing as associated design drawing information. For example, such associated design drawing information is retrieved by using, as a key, the name of a product to be produced, the name of a module constituting the product, or the name of a component used in the product. Alternatively, past design drawing information for which the usage purpose/function of a product to be produced, a module constituting the product, or a component used in the product is identical or similar to that of the changed design drawing may be retrieved by using the usage purpose or function as a search key. Further, associated past design drawing information may be retrieved by a search based on the similarity of geometric figures between a past design drawing and a design drawing that has undergone a design change. A search based on the similarity of geometric figures may be made as follows. That is, with the degree of similarity set based on the degree of overlap between geometric figures in a past design drawing and geometric figures in a design drawing that has undergone a design change, past design drawing information having a high degree of similarity is identified as associated design drawing information. Associated design drawing information may be identified by other methods. The associated-design-drawing-information identifying unit 140 represents an example of an associated-drawing-information identifying unit or second drawing information identifying unit.

As described above, if design drawings are managed by version, associated design drawing information is identified by the version management unit 141. If design drawings are not managed by version, associated design drawing information is identified by the design-drawing retrieving unit 142. Accordingly, the design-drawing-information acquiring unit 110 determines whether acquired design drawing information related to a design change is managed by version, and if the acquired design drawing information related to a design change is determined to be managed by version, the design-drawing-information acquiring unit 110 sends the design drawing information related to a design change to the version management unit 141. If the design-drawing-information acquiring unit 110 determines that the acquired design drawing information related to a design change is not managed by version, the design-drawing-information acquiring unit 110 sends the design drawing information related to a design change to the design-drawing retrieving unit 142. That is, whether to use the version management unit 141 or the design-drawing retrieving unit 142 is selected based on the design drawing information related to a design change that has been acquired by the design-drawing-information acquiring unit 110.

The production process identifying unit 150 is a processing unit that, from associated design drawing information identified by the associated-design-drawing-information identifying unit 140 and design-change-area information identified by the design-change-area identifying unit 120, identifies a production process related to a design change area. A production process in this regard refers to, for example, a factory manufacturing a product based on associated design drawing information, a production line at the factory, and a process within the production line that is related to a design change. Such a factory, a production line, and a process will be explained later with reference to examples described later. The production process identifying unit 150 represents an example of a production process identifying unit.

The basic policy information acquiring unit 160 is a processing unit that acquires, from basic policy information associated with associated design drawing information stored in the basic policy information DB 132, basic policy information related to a production process identified by the production process identifying unit 150. If basic policy information related to a production process can be acquired directly from associated design drawing information, it is not required for a production process to be identified by the production process identifying unit 150. The basic policy information acquiring unit 160 represents an example of a basic policy information acquiring unit.

The design-change evaluating unit 170 is a processing unit that evaluates a design change based on basic policy information related to a production process that has been acquired by the basic policy information acquiring unit 160. To this end, the design-change evaluating unit 170 first acquires, from the basic policy information related to a production process that has been acquired by the basic policy information acquiring unit 160, basic policy information related to a design change. Then, the design-change evaluating unit 170 evaluates a design change based on the basic policy information related to the design change. For example, the result of evaluation (evaluation result) may be such that a design change is evaluated as "Good" if the design change does not violate (contravene) basic policy information, and evaluated as "Bad" if the design change violates (contravenes) basic policy information. If a design change violates basic policy information, this means that the design change adversely affects production. If it is not possible to quantitatively or qualitatively evaluate a design change, and hence the design change can be determined to be neither "Good" nor "Bad", the design change may be evaluated as "To Be Confirmed". The design-change evaluating unit 170 represents an example of an evaluating unit. "Bad" represents an example of an indication of a violating or contravening design change.

The information output unit 180 outputs the following pieces of information to the design terminal 200: basic policy information related to a design change that has been acquired by the design-change evaluating unit 170; and the result of evaluation on the design change evaluated by the design-change evaluating unit 170. Alternatively, the information output unit 180 may output only basic policy information related to a design change without outputting the result of design change evaluation. The information output unit 180 represents an example of an output unit. Basic policy information related to a design change represents an example of a basic policy corresponding to a design change.

When the design terminal 200 receives basic policy information related to a design change and the result of design change evaluation from the information output unit 180, the controller 210 of the design terminal 200 may control the display device 220 to display the basic policy information related to a design change and/or the result of design change evaluation near a position on the display device 220 where the design change area of a design drawing related to the design change is being displayed. The evaluation result may be displayed as an icon. For example, if the evaluation result is "Bad", an alert icon "x" may be displayed. If the evaluation result is "To Be Confirmed", an alert icon "? (question mark)" may be displayed. Further, if the evaluation result is "Good", an icon "O" may be displayed.

Consequently, the designer operating the design terminal 200 is able to know, at the design phase, whether a design change made by the designer violates the basic policy. In other words, the above-mentioned configuration reduces the risk that the user may become aware for the first time at the production phase that a design change made at the design phase adversely affects production.

The timing to activate the information processing apparatus 100 will be described below.

The designer may activate the information processing apparatus 100 at whatever timing that the designer wants to obtain an evaluation for a design change made by the designer. In this case, the designer operates the input device 230 of the design terminal 200 to indicate to the controller 210 that the designer wants to obtain basic policy information related to the design change. Then, the controller 210 of the design terminal 200 transmits, in addition to pre-change design drawing information and post-change design drawing information, information (to be referred to as instruction information hereinafter) to the information processing apparatus 100 that instructs the information processing apparatus 100 to output basic policy information related to the design change. Then, upon acquisition of the pre-change design drawing information, the post-change design drawing information, and the instruction information by the design-drawing-information acquiring unit 110 of the information processing apparatus 100, the information processing apparatus 100 starts to operate. The design terminal 200 then receives, from the information output unit 180 of the information processing apparatus 100, basic policy information related to the design change and the result of design change evaluation. Alternatively, the design terminal 200 may not transmit the instruction information to the information processing apparatus 100. Instead, the instruction information may be regarded as having been acquired upon acquisition of the pre-change design drawing information and the post-change design drawing information by the design-drawing-information acquiring unit 110.

The information processing apparatus 100 may be activated at other timings. For example, the information processing apparatus 100 may be activated at the timing when the end of a series of design operations performed by the designer is detected. That is, the information processing apparatus 100 may be activated at the timing when the controller 210 of the design terminal 200 detects that the designer has not performed any operation within a predetermined time after the end of a series of design operations performed by the designer. In the present case, at the timing when it is detected that the designer has not performed any operation within a predetermined time, the controller 210 of the design terminal 200 transmits the pre-change design drawing information and the post-change design drawing information to the information processing apparatus 100. Alternatively, the information processing apparatus 100 may be activated at the timing when the designer has performed a series of design operations and saved a design drawing file created as a result of the design operations. That is, the controller 210 of the design terminal 200 saves the design drawing file, and transmits the pre-change design drawing information and the post-change design drawing information to the information processing apparatus 100. In this case, at the timing when the design drawing file is opened next time, the results of processing performed by the information processing apparatus 100 (basic policy information related to a design change and/or the result of design change evaluation) are displayed on the display device 220 of the design terminal 200.

Hardware Configuration

Figure 2:
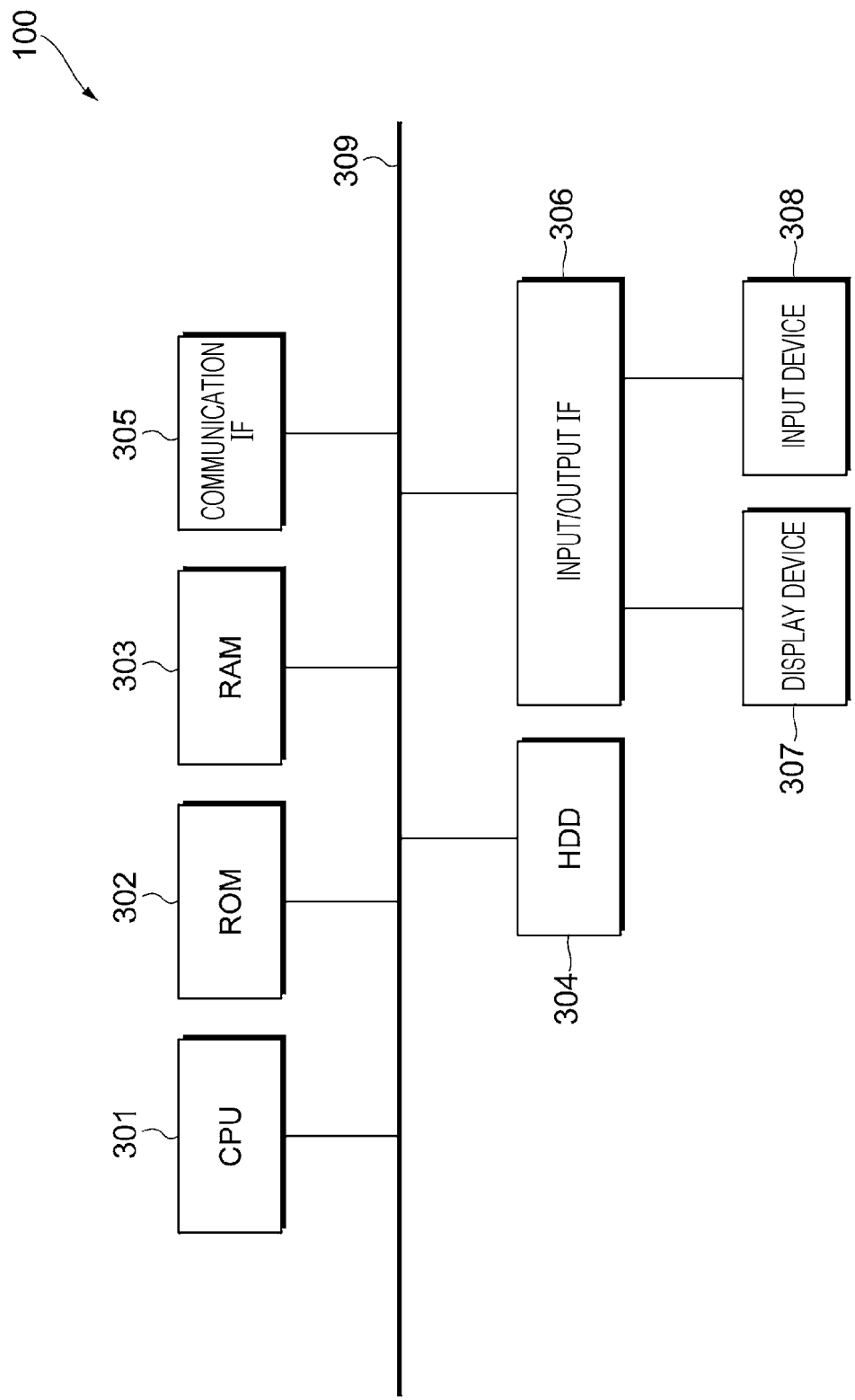
FIG. 2 illustrates an exemplary hardware configuration of an information processing apparatus.

FIG. 2 illustrates an exemplary hardware configuration of the information processing apparatus 100. The information processing apparatus 100 includes a CPU 301, a ROM 302, a RAM 303, an HDD 304, a communication input/output interface (communication IF) 305, an input/output interface (input/output IF) 306, a display device 307 connected to the input/output IF 306, an input device 308 connected to the input/output IF 306, and a bus 309.

The ROM 302 is a non-volatile memory that holds stored (written) data even with no power supply. The ROM 302 is, for example, an EPROM, an EEPROM, or a flash memory. The ROM 302 stores application software (program) for causing the information processing apparatus 100 to operate, and data such as constants or initial values of variables used by the program.

The RAM 303 is a volatile memory that loses stored data when power supply is turned off. The RAM 303 enables faster data read and write than the ROM 302. The RAM 303 is, for example, a DRAM. The RAM 303 is used as a work area onto which a program or data stored in the ROM 302 is read and loaded in executable form and which stores data for causing the information processing apparatus 100 to operate.

The HDD 304 is a rewritable non-volatile memory that holds stored (written) data even with no power supply. The HDD 304 stores a large volume of data. The HDD 304 serves as the database 130. Like the ROM 302, the HDD 304 may store application software (program) for causing the information processing apparatus 100 to operate, and data such as constants or initial values of variables used by the program.

The bus 309 is connected to the CPU 301, the ROM 302, the RAM 303, the HDD 304, the communication IF 305, and the input/output IF 306 to allow input and output of a program or data under control by the CPU 301.

The communication IF 305 is an interface that interfaces with the design terminal 200. The communication IF 305 functions as the design-drawing-information acquiring unit 110 that acquires design drawing information, and the information output unit 180 that outputs information such as basic policy information related to a design change.

The input/output IF 306 is connected to the display device 307 and the input device 308. The display device 307 is a display for viewing a design drawing or other information as an image, such as an LCD. The input device 308 is a device used to give an instruction to the CPU 301, such as a keyboard, a mouse, or a touch panel. The information processing apparatus 100 may not include the display device 307 and/or the input device 308.

At power-on, the CPU 301 reads a program or data stored in the ROM 302 (or the HDD 304), and loads the program or data onto the RAM 303 in executable form. The CPU 301 then executes the program. As the CPU 301 executes the program, data is exchanged with the HDD 304, the communication IF 305, and the input/output IF 306.

In the above-mentioned case, the ROM 302, the RAM 303, and the HDD 304 are provided. Some of the ROM 302, the RAM 303, and the HDD 304 may be implemented as rewritable non-volatile memories. Examples of such rewritable non-volatile memories include a flash memory. The ROM 302 and the RAM 303 may be integrated with the CPU 301. In this case, the ROM 302 and the RAM 303 may be implemented as rewritable non-volatile memories. Examples of such rewritable non-volatile memories include a flash memory.

It has been described above that the information processing apparatus 100 is caused to operate as an information processing apparatus by means of application software (program) stored in the ROM 302 or the HDD 304. In this case, various components units (the design-change-area identifying unit 120, the associated-design-drawing-information identifying unit 140, the production process identifying unit 150, the basic policy information acquiring unit 160, and the design-change evaluating unit 170) of the information processing apparatus 100 illustrated in FIG. 1 are implemented by the application software (program) loaded onto the RAM 303 in executable form, thus causing the information processing apparatus 100 to operate as an information processing apparatus.

As described above, the design terminal 200 operated by the designer also has a hardware configuration identical or similar to the hardware configuration illustrated in FIG. 2. The display device 220 of the design terminal 200 corresponds to the display device 307 illustrated in FIG. 2, the input device 230 corresponds to the input device 308 illustrated in FIG. 2, and the controller 210 corresponds to the CPU 301, the ROM 302, the RAM 303, and the input/output IF 306 illustrated in FIG. 2.

Although FIG. 1 depicts the design drawing information DB 131 and the basic policy information DB 132 as being included in the information processing apparatus 100, the design drawing information DB 131 and the basic policy information DB 132 may be disposed outside the information processing apparatus 100. For example, the design drawing information DB 131 may be disposed in a department to which a large number of designers belong, and the basic policy information DB 132 may be disposed at a production site. The design drawing information DB may be divided into a design drawing information DB that stores design-purpose design drawing information, and a design drawing information DB that stores production-purpose design drawing information. The only requirement in this regard is that design drawing information (design-purpose design drawing information and production-purpose design drawing information) stored in the design drawing information DB 131 be associated with basic policy information stored in the basic policy information DB 132.

Flowchart

FIG. 3 is a flowchart illustrating exemplary operation of the information processing apparatus 100.

Exemplary operation of the information processing apparatus 100 will be described below with reference to the functional block diagram of the information processing apparatus 100 illustrated in FIG. 1.

The design-drawing-information acquiring unit 110 illustrated in FIG. 1 acquires pre-change design drawing information and post-change design drawing information (step 101, indicated as S101 in FIG. 3; the same applies to other steps).

The design-change-area identifying unit 120 illustrated in FIG. 1 identifies a design change area from the difference between the pre-change design drawing information and the post-change design drawing information (step 102).

The associated-design-drawing-information identifying unit 140 illustrated in FIG. 1 identifies associated design drawing information associated with design drawing information that is subject to a design change (step 103).

The production process identifying unit 150 illustrated in FIG. 1 identifies, from information about the associated design drawing information and the design change area, a production process by which a product has been produced based on the associated design drawing information (step 104).

Next, the basic policy information acquiring unit 160 illustrated in FIG. 1 acquires, from basic policy information associated with the associated design drawing information, basic policy information related to the production process identified at step 104 (step 105).

Then, the design-change evaluating unit 170 illustrated in FIG. 1 acquires, from the basic policy information acquired at step 105, basic policy information related to the design change that has been made, and evaluates whether the design change violates the basic policy (step 106).

Then, the information output unit 180 illustrated in FIG. 1 outputs the basic policy information related to the design change that has been acquired at step 106, and the evaluation result on the design change evaluated at step 106 (step 107).

If the result of design change evaluation at step 106 is "Good", at step 107, the information output unit 180 may output only the result of design change evaluation ("Good") without outputting basic policy information related to the design change.

If the result of design change evaluation at step 106 is "Bad", at step 107, the information output unit 180 may desirably output the result of design change evaluation ("Bad") and basic policy information related to the design change. If basic policy information related to the design change is not output, the designer is unable to know why the design change has been evaluated as "Bad", and hence unable to correct the design change accordingly.

As described above, the result of design change evaluation at step 106 may be "To Be Confirmed".

At step 107, the result of design change evaluation may not be output. In this case, basic policy information related to the design change is output. In this case, the designer may determine whether the design change violates the basic policy from the basic policy information related to the design change.

Next, examples will be described.

EXAMPLE 1

The following describes, as Example 1, a case where a design change is made to change the placement of a component to be soldered.

FIG. 4 illustrates exemplary basic policy information according to Example 1. Basic policy information is stored in the basic policy information DB 132 illustrated in FIG. 1. In the present case, basic policy information is represented in the form of a table.

Basic policy information represents information about, for example, constraints/prerequisites/know-how for design/production. The basic policy information illustrated in FIG. 4 includes information about a design drawing (referred to as drawing in FIG. 4), a factory at which a product has been produced based on the design drawing, a production line at the factory, and a process within the production line. Further, information about a process includes a category, an item, and a value. Serial numbers (to be indicated by # hereinafter) are placed at the left end of FIG. 4 for the convenience of description. #1 to #13 each represent basic policy information for Design Drawing A. #14 represents basic policy information for Design Drawing C, and #15 represents basic policy information for Design Drawing X.

In FIG. 4, #1 to #13 each represent basic policy information about a production line that performs board mounting at the Shizuoka factory. Of these serial numbers, #1 to #5 each represent basic policy information related to a component placement process, #6 to #11 each represent basic policy information related to a soldering process, and #12 and #13 each represent basic policy information related to an image inspection process.

An electronic circuit generally includes components (electronic components) such as a semiconductor circuit (e.g., an LSI or IC), a capacitor, and a resistor that are placed on a circuit board (printed circuit board). The circuit board is formed by providing a board made of an insulating material, such as glass epoxy, with wiring made of a conductive material, such as a copper (Cu) foil. In the following description, placing a component on a circuit board will be referred to as board mounting.

Board mounting is performed as follows. First, an adhesive for securing a component is applied or printed to an area on a circuit board where the component is to be placed. Next, the component is placed onto an area on the circuit board where the adhesive is provided (an area where the component is to be placed), by using equipment (e.g., a chip mounter) that is computer-controlled to automatically place the component onto the circuit board (component placement process).

Next, the circuit board with the component secured by the adhesive is passed over equipment (solder bath) containing molten solder to connect the terminals of the component with wiring connections on the board (soldering process). At this time, the circuit board is disposed such that the side of the circuit board where the component is placed faces the solder bath. Then, the solder is spouted upward (into a jet flow) from the solder bath and blown onto the circuit board. Thus, solder is left (put) between the terminals of the component and the wiring connections on the circuit board, thus connecting the terminals of the component with the wiring connections on the circuit board.

Whether the placement of the component on the circuit board is correct, and where the solder connection is secure are inspected by using equipment that recognizes and assesses a captured image of the surface of the circuit board (image inspection process). The above-mentioned method of passing a circuit board over a solder bath to solder a component to the circuit board is called flow soldering.

The component placement process within the production line that performs board mounting uses a chip mounter or other such equipment. Accordingly, for #1 and #2 related to the component placement process, basic policy information on equipment is stored. That is, for #1, information with the category "XX equipment", the item "Manufacturer", and the value "XX company" is stored. For #2, information with the category "XX equipment", the item "Model", and the value "X100001" is stored. These pieces of information represent constraints for the component placement process.

Next, for #3, a prerequisite in using the equipment represented by #1 and #2 is stored as basic policy information. That is, for #3, information with the category "Prerequisite", the item "Specification" (whether production is possible), and the value "Production is not possible unless the component pitch is 1 mm or more" is stored. For #4, know-how in using the equipment represented by #1 and #2 is stored as information. That is, for #4, information with the category "Know-how", the item "Productivity", and the value "Insertion takes time unless the component pitch is 2 mm to 3 mm" is stored.

The soldering process within the production line that performs board mounting uses equipment such as a solder bath. Accordingly, for #6 and #7 related to the soldering process, basic policy information on equipment is stored. That is, for #6, information with the category "AA equipment", the item "Manufacturer", and the value "AA company" is stored. For #7, information with the category "AA equipment", the item "Model", and the value "A999999" is stored. These pieces of information represent constraints for the soldering process.

Next, for #8, a prerequisite in using the equipment represented by #6 and #7 is stored as basic policy information. That is, for #8, information with the category "Solder", the item "Type", and the value "tin: 60%, lead: 40%" is stored. #8 represents a prerequisite. For #9 and #10, know-how in using the equipment represented by #6 and #7 is stored as information. That is, for #9, information with the category "Know-how", the item "Quality", and the value "Orient the component orthogonally to the direction of board flow" is stored, and for #10, information with the category "Know-how", the item "Quality", and the value "Separate the board's edge and the component by 2 cm or more" is stored.

The image inspection process within the production line that performs board mounting uses equipment that captures an image of the board's surface for recognition and assessment of the captured image. Accordingly, for #12 and #13 related to the image inspection process, basic policy information on equipment is stored. That is, for #12, information with the category "YY equipment", the item "Manufacturer", and the value "YY Company" is stored. For #13, information with the category "YY equipment", the item "Model", and the value "Y123456" is stored. These pieces of information represent constraints for the image inspection process.

10 represents information related to Design Drawing A with the category "Know-how", which is related to a soldering process at the Shizuoka factory. Some descriptions of this information are omitted. #14 represents information about the Shizuoka factory related to Design Drawing C, and #15 represents information about the Chiba factory related to Design Drawing X. Some descriptions of these pieces of information are omitted.

As described above, the basic policy information DB 132 stores the following pieces of information as basic policy information for the case where board mounting is performed based on Design Drawing A in a production line that performs board mounting at the Shizuoka factory: constraints related to equipment; prerequisites in using the equipment; and know-how in performing various processes (component placement, soldering, and image inspection) related to board mounting. If the equipment used in each of the processes included in board mounting differs from that mentioned above, the associated constraints, prerequisites, and know-how differ from those mentioned above. For cases where multiple different production lines related to board mounting are present within the same factory, the associated constraints, prerequisites, and know-how may sometimes differ for different production lines. Further, the associated constraints, prerequisites, and know-how may sometimes differ for different factories due to the difference in equipment used. A category, an item, and a value are provided for the purpose of facilitating search by the information processing apparatus 100. Accordingly, information other than a category, an item, and a value may be added, or a category, an item, and a value may be changed.

The basic policy information illustrated in FIG. 4 represents a part of basic policy information related to the production line that performs board mounting used in the production of a product based on Design Drawing A. Other production lines, such as assembly, are also used in the production of a product based on Design Drawing A. Accordingly, the basic policy information DB 132 stores every piece of basic policy information related to the production of a product based on Design Drawing A. The basic policy information DB 132 also stores basic policy information related to the production of a product based on other design drawings (e.g., Design Drawings C and X).

Prior to the start of production of a product based on Design Drawing A, information related to, for example, the equipment or jig used for the production (such as "Manufacturer", "Model", and "Specification") is registered into the basic policy information DB 132 by a person in charge of preparing for the production. For example, in the case of the soldering process, the information registered at this time includes the manufacturer and model of the equipment (solder bath) used for soldering, and the type of solder used for soldering.

During the production of a product based on Design Drawing A, whenever a piece of know-how on production is obtained, such piece of know-how is additionally registered into the basic policy information DB 132 by the production manager or production site manager. For example, in the case of the component placement process, when a finding that "a distance of less than 2 cm between the board's edge and the component increases the risk of defects" is obtained, the following information is registered as a piece of know-how: "Separate the board's edge and the component by a distance of 2 cm or more". In the case of the soldering process, when a finding that "orienting the component parallel to the direction of board flow increases the risk of defective or poor soldering" is obtained, the following information is registered as a piece of know-how: "Orient the component orthogonally to the direction of board flow".

Next, a description will be given of a case where the designer of a board makes a design change.

A case is considered in which, following the end of production of a hitherto used capacitor, the designer decides to switch to an alternative capacitor. In placing the alternative capacitor, the designer changes the orientation of the capacitor, thinking that this will result in shorter wiring. That is, in the post-change design drawing reflecting this design change, the placement of the alternative capacitor in the soldering process is changed to "placement parallel to the direction of board flow". In this regard, in the pre-design drawing prior to the design change, the capacitor placement in the soldering process is "placement orthogonal to the direction of board flow".

The design-drawing-information acquiring unit 110 of the information processing apparatus 100 acquires pre-change design drawing information and post-change design drawing information.

The design-change-area identifying unit 120 detects a design change to the circuit board from the difference between the pre-change design drawing information and the post-change design drawing information, and identifies "capacitor placement" as the area of design change.

The version management unit 141 of the associated-design-drawing-information identifying unit 140 identifies, from the pre-change design drawing information, Design Drawing A as associated design drawing information that is associated with the design drawing information to which the design change is being made.

From the associated design drawing information, the production process identifying unit 150 identifies that the design change has been made to a circuit board corresponding to the scanner function portion of Multifunction Machine X, which is currently in production and features a copier function, a scanner function, a FAX transmitting and receiving function, and a print function. At this time, the production process identifying unit 150 also identifies that this circuit board is produced in a production line that performs board mounting at the Shizuoka factory.

Next, by using the identified production line as a key, the basic policy information acquiring unit 160 acquires, from the basic policy information DB, basic policy information (#1 to #13 in FIG. 4) for the production line that performs board mounting.

The design-change evaluating unit 170 makes a comparison between each of the acquired pieces of basic policy information (#1 to #13 in FIG. 4), and the capacitor placement (placement parallel to the direction of board flow) representing the design change area. Then, the design-change evaluating unit 170 acquires, as the basic policy related to the design change, the following information represented by #9: "Orient the component orthogonally to the direction of board flow in the soldering process". Further, the design-change evaluating unit 170 determines that placing the capacitor in a "placement parallel to the direction of board flow in the soldering process" violates the basic policy "Orient the component orthogonally to the direction of board flow in the soldering process". Accordingly, the design-change evaluating unit 170 evaluates this design change as "Bad".

Then, the information output unit 180 outputs the basic policy information related to the design change (#9: "Orient the component orthogonally to the direction of board flow in the soldering process"), and the evaluation result ("Bad"). At this time, the evaluation result "Bad" is displayed as an alert icon (e.g., "x"), at a position on the display device 220 of the design terminal 200 near the design change area of the design drawing to which the design change is being made. The basic policy information related to the design change may be displayed together with the alert icon, or may be displayed upon clicking the alert icon.

Then, upon checking the evaluation result "Bad", the designer realizes that there is a defect in the design from the viewpoint of production. Further, the designer checks the basic policy information related to the design change to obtain understanding of the basic policy, which is necessary in fixing the design defect, and corrects the capacitor placement in the soldering process to a placement orthogonal to the flow direction of the circuit board.

If the design-change evaluating unit 170 determines that the design change does not violate the basic policy, the design change is evaluated as "Good". In this case, it is not required for the information output unit 180 to output the basic policy information related to the design change area. That is, only the result of design change evaluation ("Good") needs to be output.

If the design-change evaluating unit 170 is unable to quantitatively or qualitatively evaluate the design change, and hence the design change can be determined to be neither "Good" nor "Bad", the design change may be evaluated as "To Be Confirmed". Alternatively, only the basic policy information related to the design change may be output without outputting the evaluation result.

EXAMPLE 2

The following description of Example 2 will be directed to the case of making a design change that changes a component used in assembly. Although Example 1 is described above with reference to the exemplary basic policy information illustrated in FIG. 4, Example 2 will be described below without reference to such exemplary basic policy information.

A case is considered in which a designer who designs the housing of Multifunction Machine A, which is identical or similar to Multifunction Machine X according to Example 1, uses the design terminal 200 to make a design change to Assembly Component A used inside the housing. The design change involves cutting a hole in the side face of Assembly Component A to reduce the weight of Assembly Component A. The designer then creates a post-change design drawing related to Assembly Component A of Multifunction Machine A that reflects the design change.

The design-drawing-information acquiring unit 110 of the information processing apparatus 100 acquires pre-change design drawing information and post-change design drawing information that are related to Assembly Component A.

Then, from the difference between the pre-change design drawing and the post-change design drawing, the design-change-area identifying unit 120 detects that a design change has been made to Assembly Component A, and identifies the "hole in the side face" of Assembly Component A to be the area of design change.

Then, the associated-design-drawing-information identifying unit 140 identifies, from past design drawing information stored in the design drawing information DB 131, design drawing information associated with the design/production of Assembly Component A. Further, the associated-design-drawing-information identifying unit 140 identifies, from the past design drawing information stored in the design drawing information DB 131, design drawing information associated with the production of a module such as a housing that uses Assembly Component A or of a product that uses Assembly Component A. The design drawing information associated with the design/production of Assembly Component A, and the design drawing information associated with the production of a module such as a housing that uses Assembly Component A or of a product that uses Assembly Component A each represent associated design drawing information associated with Assembly Component A.

Next, based on the associated design drawing information associated with Assembly Component A, the production process identifying unit 150 identifies a production process (factory, production line, and process) producing Assembly Component A, and a production process (factory, production line, and process) producing a module such as a housing that uses Assembly Component A or a product that uses Assembly Component A. For example, Assembly Component A is identified to be produced in a production line producing Assembly Component A at the Shizuoka factory, and Multifunction Machine A, which uses the housing using Assembly Component A, is produced in Assembly Process 1 of a production line producing Multifunction Machine A at the Saitama factory.

By using each identified production process as a key, the basic policy information acquiring unit 160 acquires the following pieces of information from the basic policy information DB 132: basic policy information about the design/production of pre-change Assembly Component A, which represents Assembly Component A prior to undergoing a design change, of Multifunction Machine A; and basic policy information about the production of Multifunction Machine A that uses the housing using Assembly Component A. At this time, the following pieces of basic policy information are acquired: basic policy information related to a production process (Shizuoka factory, and Assembly-Component-A production line) that produces pre-change Assembly Component A; and basic policy information related to a production line (Saitama factory, Multifunction-Machine-A production line, and Assembly Process 1) that produces Multifunction Machine A by use of the housing using Assembly Component A.

Now, it is assumed that at this time, the design-change evaluating unit 170 acquires, from the basic policy information about the production line (Saitama factory, Multifunction-Machine-A production line, and Assembly Process 1) producing Multifunction Machine A by use of the housing using Assembly Component A, the following basic policy as basic policy information related to the design change: "To prevent peeling of a sticker affixed to the side face of Assembly Component A, the bond surface with the sticker is required to have a sufficiently large area".

In this regard, the above-mentioned "hole in the side face", which is provided to Assembly Component A due to the design change, causes the area of the side face of Assembly Component A to decrease. Accordingly, the design-change evaluating unit 170 determines that this decrease in the area of the side face of Assembly Component A possibly violates the basic policy "To prevent peeling of a sticker affixed to the side face of Assembly Component A, the bond surface with the sticker is required to have a sufficiently large area". However, since there is no quantitative index about the area of the bond surface, no evaluation can be made. Accordingly, the design-change evaluating unit 170 evaluates the design change as "To Be Confirmed".

The information output unit 180 outputs the following pieces of information to the design terminal 200: the basic policy information related to the design change (which in this case represents the basic policy "To prevent peeling of a sticker affixed to the side face of Assembly Component A, the bond surface with the sticker is required to have a sufficiently large area"); and the evaluation result supplied from the design-change evaluating unit 170.

Upon receiving the evaluation result ("To Be Confirmed"), the controller 210 of the design terminal 200 displays an alert icon "?" at a position on the display device 220 near the changed area of the design drawing to which the design change has been made. That is, the design drawing and the evaluation result (basic policy information corresponding to the design change and the evaluation result) are displayed side by side on the display device 220. Then, by checking the alert icon "?", the designer of the housing recognizes that there is a matter that needs to be confirmed about the design change. At the same time, by checking the basic policy information related to the design change, the designer understands the situation (scene) in which Assembly Component A is used. Accordingly, the designer of the housing may consult with a relevant department or other entities to confirm whether the design change will adversely affect production.

In the foregoing description, basic policy information is acquired based on a production process identified by the production process identifying unit 150. In this regard, if basic policy information can be directly acquired from associated design drawing information, it is not required for a production process to be identified by the production process identifying unit 150.

Modifications

The foregoing description is directed to cases where a design change is made.

In this regard, the exemplary embodiment is applicable not only to cases where a design change is made but also to cases where a new product is designed. This will be described below with reference to FIG. 1.

For cases other than when a design change is made, that is, for cases when there is no previously designed product, there is no pre-change design drawing. Consequently, the design-change-area identifying unit 120 illustrated in FIG. 1 is unable to identify a design change area from design drawings acquired by the design-drawing-information acquiring unit 110. Accordingly, prior to identifying of a design change area by the design-change-area identifying unit 120, the associated-design-drawing-information identifying unit 140 is caused to acquire associated design drawing information associated with a design drawing. That is, as described above, associated design drawing information is acquired by the design-drawing retrieving unit 142. The design-change-area identifying unit 120 may then be made to identify a design change area from the difference between the design drawing and the associated design drawing information. In this case, a design drawing used for the design of a new product may be regarded as representative of a post-change design drawing. In other words, the design drawing information for the new product represents an example of first drawing information.

In this case, in the flowchart illustrated in FIG. 3, step 102, which identifies a design change area, and step 103, which identifies associated design drawing information, may be interchanged.

A program may cause a computer to function as the following units: an acquiring unit that acquires first drawing information; an identifying unit that identifies second drawing information associated with the first drawing information; an acquiring unit that acquires basic policy information associated with the second drawing information, the basic policy information representing a basic policy for design/production; and an output unit that, in response to acquisition of information instructing that a design change be made to the first drawing information, outputs a basic policy corresponding to the design change from the basic policy information. At this time, in one exemplary embodiment, the program may be provided while being stored in a storage medium, or may be provided by means of communication. In this case, such an exemplary embodiment may be regarded as an exemplary embodiment of a "non-transitory computer readable medium storing a program".

A "non-transitory computer readable medium storing a program" refers to a computer-readable medium in which a program is stored and which is used for purposes such as installing, executing, and distributing the program.

Examples of such storage media include a digital versatile disc (DVD) based on the specifications developed by the DVD forum, a compact disc (CD), a Blue-ray (registered trademark) disc, a magneto-optical disk (MO), a flexible disk (ED), a magnetic tape, an HDD, a ROM, and a flash memory.

The exemplary embodiment of the present disclosure has been described above. It is to be understood that various alterations and structural substitutions not departing from the technical idea or scope of the present disclosure are within the scope of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor that:
      acquires first drawing information used for design;
      identifies second drawing information associated with the first drawing information;
      identifies a design change area representing an area of the design change made to the first drawing information;
      acquires basic policy information associated with the second drawing information, the basic policy information representing a basic policy for at least one of design and production; and
      in response to acquisition of information instructing that a design change be made to the first drawing information, outputs, as the basic policy corresponding to the design change, the basic policy information related to the design change area.

2. The information processing apparatus according to claim 1, wherein the first drawing information includes a pre-design-change drawing and a post-design-change drawing, the pre-design-change drawing representing a drawing prior to undergoing the design change, the post-design-change drawing representing a drawing reflecting the design change; and
   wherein the processor identifies, as the design change area, a difference between the pre-design-change drawing and the post-design-change drawing.

3. The information processing apparatus according to claim 2, wherein if the difference between the pre-design-change drawing and the post-design-change drawing corresponds to a component, the processor identifies the component as the design change area.

4. The information processing apparatus according to claim 1,
   wherein the first drawing information includes pre-design-change drawing information and post-design-change drawing information, the pre-design-change drawing information representing drawing information prior to undergoing the design change, the post-design-change drawing information representing drawing information reflecting the design change, and
   wherein the processor identifies the second drawing information from a drawing database storing a drawing as information, the second drawing information being identified by identifying, based on version, drawing information managed by its version attached to the pre-design-change information, or by identifying, based on similarity, drawing information similar to the post-design-change drawing information.

5. The information processing apparatus according to claim 1,
   wherein the processor acquires the basic policy information associated with the second drawing information from a basic policy information database, the basic policy information database storing, as information, a basic policy for at least one of design and production.

6. The information processing apparatus according to claim 1,
   wherein the processor evaluates the design change, and acquires, from the basic policy information associated with the second drawing information, a basic policy corresponding to the design change.

7. The information processing apparatus according to claim 6, further comprising
   the processor identifies a production process in which a product is produced by using the second drawing information,
   wherein the production process includes a production process related to the design change area, and
   wherein the processor acquires, as the basic policy corresponding to the design change, a basic policy corresponding to the production process related to the design change area.

8. The information processing apparatus according to claim 7,
   wherein the processor generates, if the design change violates the basic policy corresponding to the design change, information indicating that the design change violates the basic policy.

9. The information processing apparatus according to claim 1,
   wherein the processor, in response to acquisition of instruction information to output a basic policy related to the design change as information, outputs the basic policy related to the design change as information.

10. The information processing apparatus according to claim 9,
    wherein the instruction information is given from a designer who designs a drawing related to the first drawing information.

11. The information processing apparatus according to claim 10,
    wherein the instruction information comprises information representing an instruction made by a designer to instruct that the first drawing information be stored, the designer being a designer who designs a drawing related to the first drawing information.

12. The information processing apparatus according to claim 1,
    wherein the first drawing information includes a first drawing, and
    wherein the processor acquires, as information, a basic policy corresponding to the design change, and outputs the basic policy such that the basic policy is displayed on a display side by side with the first drawing, the display being viewed by a designer.

13. A non-transitory computer readable medium storing a program causing a computer to execute a process, the process comprising:
- acquiring first drawing information;
- identifying second drawing information associated with the first drawing information;
- identifying a design change area representing an area of the design change made to the first drawing information;
- acquiring basic policy information associated with the second drawing information, the basic policy information representing a basic policy for at least one of design and production; and
- in response to acquisition of information instructing that a design change be made to the first drawing information, outputting, as the basic policy corresponding to the design change, the basic policy information related to the design change area.

\* \* \* \* \*